United States Patent [19]

French

[11] 4,000,830

[45] Jan. 4, 1977

[54] LID FOR A COOKING UTENSIL

[76] Inventor: Grace Allson French, 1744 17th St., Cuyahoga Falls, Ohio 44223

[22] Filed: Dec. 15, 1975

[21] Appl. No.: 640,628

[52] U.S. Cl. .............................. 220/369; 220/361; 220/373; 220/206

[51] Int. Cl.² ....................................... B65D 51/16

[58] Field of Search .......... 220/369, 360, 361, 366, 220/367, 373, 206

[56] References Cited

UNITED STATES PATENTS

| | | | |
|---|---|---|---|
| 2,609,960 | 9/1952 | Irwin | 220/369 |
| 2,643,024 | 6/1953 | Cronheim | 220/367 |
| 3,598,105 | 8/1971 | Cristaldi | 220/369 X |

Primary Examiner—William Price
Assistant Examiner—Steven M. Pollard
Attorney, Agent, or Firm—Oldham & Oldham Co.

[57] ABSTRACT

A lid for a cooking utensil wherein a substantially flat central section has a rim thereabout for engagement with the cooking utensil. Depending from the central section is a recessed plate characterized by a plurality of venting holes therein. A sliding cover is presented over the recessed plate for opening or closing the venting holes and may be totally removed therefrom for cleaning purposes. A further venting hole is presented about the rim periphery to vent the cooking utensil independently of the recessed plate. A dome-shaped cover may be incorporated to provide a steam or heat chamber above the lid by capturing steam escaping through the holes in the recessed plate. Venting holes may also be provided in the dome-shaped cover to provide for steam escapement so as to limit the moisture condensation within the cover.

11 Claims, 3 Drawing Figures

LID FOR A COOKING UTENSIL

BACKGROUND OF THE INVENTION

Heretofore numerous types of skillets, pans and other types of cooking utensils have been known for the preparation of singular food commodities; that is, a separate utensil being necessary for the preparation of each type of food. During such preparation, heat and/or steam escapes from the prepared food and either enters into the room in which the food is being prepared or is exhausted to the outside. Such escapement or exhaust results in a substantial waste of thermal energy. Since it is often required by those preparing food to either warm, steam, or rewarm small quantities of food other than the main dish, such as baked goods, baby food, leftovers and the like, it is desirable to utilize the otherwise wasted thermal energy for such purposes.

Still further, it has been known that the frying of foods in an oil or margarin medium often results in a splattering of grease into the area surrounding the cooking utensil and inherently creates an untidy situation. To prevent such grease splattering, a cover of some type is necessary for the skillet or fry pan and heretofore there have been introduced mesh coverings for such purposes. However, such coverings quickly saturate with grease and become quite difficult to clean. Further, double lids have been proposed wherein holes in each of two lid coverings are brought into and out of registration for venting purposes while preventing splattering. Again, such double-lid structures have been found difficult to keep clean and sanitary since grease often embeds itself between the two lids.

Consequently, it is an object of the instant invention to present a cooking utensil and particularly a pan cover which is operative for preventing grease splattering while being substantially impervious to clogging and which is easily cleaned.

It is a further object of the invention to prevent a cooking utensil wherein a pan cover is provided with vents or the like for communication with an area wherein small quantities of side dishes, leftovers or the like may be placed and be steamed, warmed or reheated by the escaping heat and steam from the preparation of the main dish.

Yet a further object of the invention is to present a cooking utensil which is simplictic in structure, effective in operation, easily cleaned and relatively inexpensive to construct.

These objects and other objects which will become apparent as the detailed description proceeds are achieved by: a substantially flat central section having a recessed plate suspended therefrom, the plate being characterized by a plurality of venting holes passing therethrough; a first edge member connected to the central section in angled depending relationship about the periphery thereof; a second edge member connected to the first edge member in angled ascending relationship about the periphery thereof; and a lip connected about the circumference of the second edge member in substantial parallel planar relationship with the flat central section.

DESCRIPTION OF THE DRAWING

For a complete understanding of the objects and structure of the invention, reference should be had to the following detailed description and accompanying drawing, wherein.

DESCRIPTION OF THE PREFERRED EMBODIMENT

Figure 1:
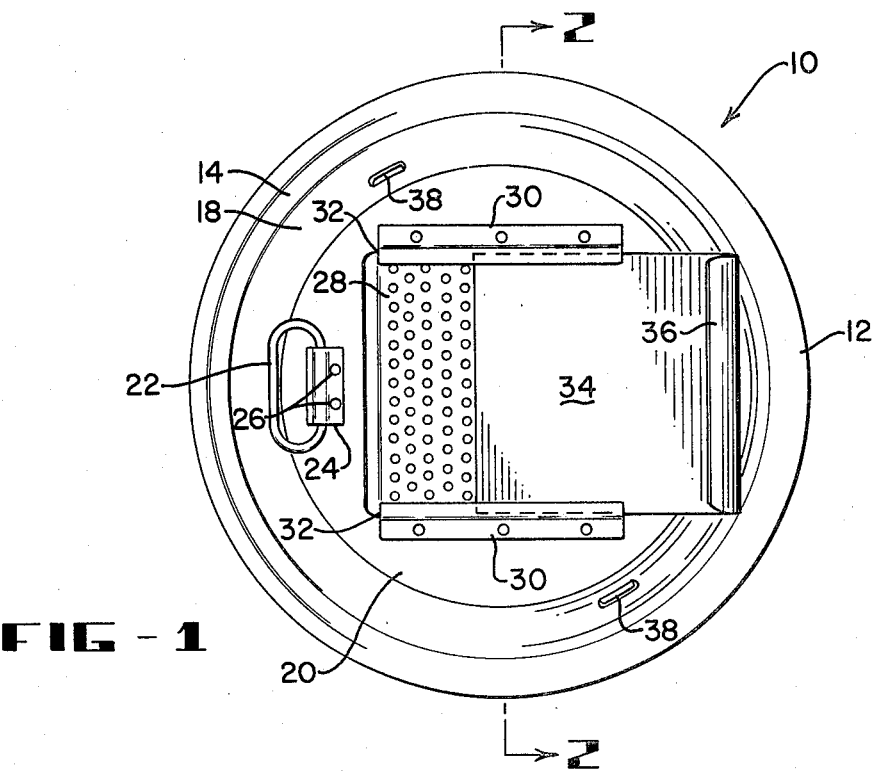
FIG. 1 is a top plan view of the lid structure of the invention.
Figure 2:
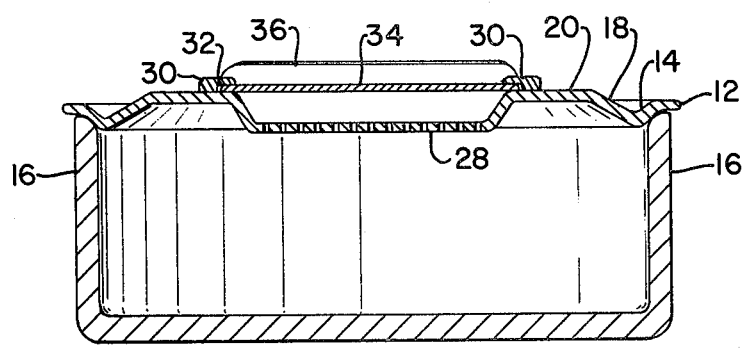
FIG. 2 is a cross-sectional view of the structure of FIG. 1 taken along the line 2—2 and showing the seating of the lid upon a pan or other cooking utensil.

With reference now to FIGS. 1 and 2, it can be seen that the lid structure of the invention is designated generally by the numeral 10 and is preferably of circular shape. Of course, the lid 10 may be of any suitable size or shape depending upon the frying skillet or sauce pan with which the lid is to be used. About the outer circumferential edge of the lid 10 is a flanged rim 12 having a seat 14 depending therefrom and in sloped engagement therewith. The combination of the ring 12 and the sloped lip 14 provides a seat for engagement with the top lip of a saucepan or other appropriate cooking utensil 16. As ascending sloping side 18 is connected to the portion 14 and completely encircles a top plate 20 which essentially comprises the lid. For purposes of manipulating the lid 10, an appropriate handle 22 is secured by a bracket 24 which in turn is engaged to the circular top plate 20 by means of rivets, weld joints, or other affixing means 26.

A recessed plate 28 is preferably located centrally of the circular plate 20 and contains a plurality of venting holes passing therethrough. The plate 28 is recessed preferably to be in close juxtaposition of frying food and is further recessed to provide a receptacle for baby food jars and other such small containers. Along each side of the recess 28 is a bracket 30 formed as at 32 to provide a way for receipt of a removable slide or tray 34. The tray 34 may, of course, have a curved end 36 for purposes of serving as a handle or the like. It should be appreciated that the tray 34 is completely removable from the way 32 such that cleaning of the recess 28 and the tray 34 may be easily achieved. It should also be noted, with respect to the lid 10, that a vent 38 is provided along the ascending edge 18 to provide for steam escapement even if the tray 36 is sealed over the recess 28. Thus there is no pressure buildup within the pan 16 even when the vent holes of 28 are closed.

Figure 3:
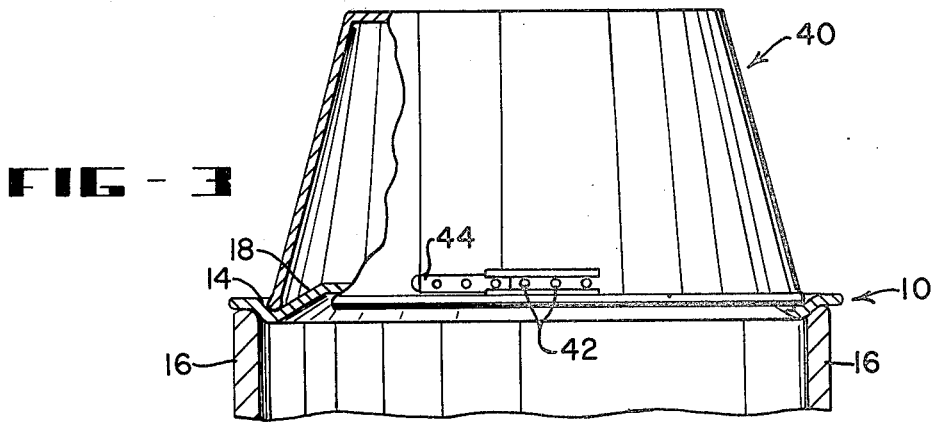
FIG. 3 is a side plan view of a cover which may be utilized in combination with the lid of FIGS. 1 and 2.

With reference now to FIG. 3, it can be noted that a cover 40 may also be provided in combination with the lid 10 to provide a steam or heat chamber above such lid. The circular cover 40 (which could also be a bowl or the like) is of such size as to engage at the point of intersection between the sloping elements 14, 18 of the lid 10 in substantially sealed engagement therewith. A plurality of vents 42 may be provided in such a manner as to be opened by means of a slide 44 along the side of the cover 40 for purposes of steam escapement. It should now be readily appreciated that with buns or other pastry placed atop the lid 10 and covered by means of the cover 40, the buns may be steam heated if the food prepared within the utensil 16 is in a liquid medium. Similarly, leftovers, baby food or the like might also be warmed in the heat chamber defined by the cover 40.

Of course, the structures presented hereinabove may be made by any suitable material but are preferably of aluminum or stainless steel construction. It should further be appreciated, with an understanding of the structure of the invention, that the invention is not only useful in heating, steaming or rewarming food, but the provision of the steam escapement holes within the plate 28 and vent 38 provide for the successful cooking of vegetables which have a tendency to "run over" such as potatoes, peas, fruit sauces and the like since the minimal escapement of steam prevents such boiling over. Further, the recessed area 28, in close position relationship with frying food acts as a baster in that steam and grease condense upon the recessed area 28 and drips back upon the cooking food. Yet further, food may be readily thawed by placement upon top the lid 10 and such thawing may be further hastened by placement of the cover 40. The number of uses of the structure of the invention is virtually unlimited and left to the imagination of the user.

Thus it can be seen that the objects of the invention have been satisfied by the structure presented hereinabove. While in accordance with the patent statutes only the best mode and preferred embodiment of the invention has been presented and described in detail, it is to be understood that the invention is not limited thereto or thereby. Consequently, for an appreciation of the scope of the invention, reference should be had to the appended claims.

What is claimed is:

1. A lid for a cooking container, comprising:
 a substantially flat central section having a recessed rectangular plate suspended therefrom, the plate being characterized by a plurality of venting holes passing therethrough;
 a way connected to the flat central section on each side of the recessed plate;
 a first edge member connected to the central section in angled depending relationship about the periphery thereof;
 a second edge member connected to the first edge member in angled ascending relationship about the periphery thereof; and
 a lip connected about the circumference of the second edge member in substantial parallel planar relationship with the flat central section.

2. The lid as recited in claim 1 which further includes a handle connected to the flat central section.

3. The lid as recited in claim 1 which further includes a slide received between the ways in slidingly removable engagement therewith.

4. The lid as recited in claim 3 wherein the slide is planar in nature having a curled end piece comprising a handle.

5. The lid as recited in claim 1 wherein the first edge member is characterized by the presence of a venting hole passing therethrough.

6. The lid as recited in claim 1 which further includes a cover in removable sealing engagement with the first and second edge members.

7. The lid as recited in claim 6 wherein the cover is characterized by the presence of a vent in the side thereof, the vent being opened and closed by movement of a vent cover.

8. A lid for using with a cooking container, comprising:
 a circular planar plate having a recessed rectangular area centrally located therein;
 a rectangular plate characterized by a plurality of vent holes therein connected to the circular planar plate in suspended parallel relationship therewith;
 guides on each side of the recessed rectangular area;
 a cover plate removably and slidingly engaged with the guides; and
 a rim about the periphery of the circular planar plate for engagement with the top circumferential edge of the cooking container.

9. A lid according to claim 8 which further includes a cover in substantial sealing engagement with the rim, the cover having vents therein.

10. A lid according to claim 8 wherein the rim is characterized by the presence of a vent hole therein.

11. A lid according to claim 8 wherein the rim depends below the circular planar surface.

* * * * *